March 20, 1951     A. J. MURRAY     2,545,528

SERVICE UNIT FOR HOT FOODS

Filed Jan. 27, 1949

*INVENTOR.*
ARTHUR J. MURRAY
BY
*Williamson & Williamson*
ATTORNEYS

Patented Mar. 20, 1951

2,545,528

UNITED STATES PATENT OFFICE 2,545,528

SERVICE UNIT FOR HOT FOODS

Arthur J. Murray, Minneapolis, Minn.

Application January 27, 1949, Serial No. 73,203

2 Claims. (Cl. 65—15)

This invention relates to serving units for hot or sizzling foods adapted for restaurant and home use to protect the hands of the chef, waitress and user, as well as to retain heat for a prolonged period in the food itself.

It is an object of my invention to provide a simple, substantially indestructible service unit comprising an inner hot food platter or plate and a compact outer protective and insulating platter of relatively non-conductive hard material, said platters being so constructed and functionally related that a minimum contact area only is established between the two, minimizing heat conduction transmissively from hot platter to insulating platter and further, producing efficient insulation of substantially the entire outer contour of the hot platter to materially prolong the heating of the hot food supported thereby.

It is a further object to provide a two-part, uncovered serving unit of the class described wherein a metallic hot food platter is surrounded peripherally and at the bottom by a compact, protective and insulating platter, of non-frangible structure, said platters when assembled, providing there between, a thin, "dead air," insulating space or chamber covering the entire bottom and the peripheral walls and part of the upper flange of the heat-conductive upper plate or platter.

Another object is the provision of a service plate of the class described having improved facilities for very efficiently retaining the heat at high temperature, of an inner metallic plate while compactly covering and embracing the peripheral edge and outer contour of the plate to protect the persons serving food in said unit as well as the person served.

A further object is the provision of a hot food serving unit of the class described wherein the outer insulating plate may be constructed from commercial, thermosetting plastic materials to withstand temperatures exceeding 400° F. of the metallic plate or platter, thereby making possible the use of substantially indestructible and highly ornate materials to produce the results desired.

These and other objects and advantages of my invention will more fully appear from the following description made in connection with the accompanying drawings wherein like reference characters refer to similar parts throughout the several views and in which.

Figure 1:
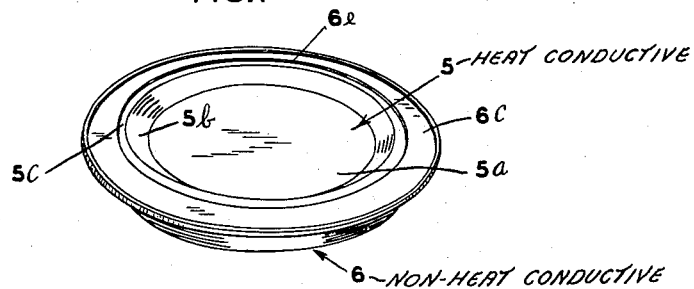
Fig. 1 is a top perspective view illustrating an embodiment of my serving unit in the form of a compact individual plate assembly.
Figure 2:
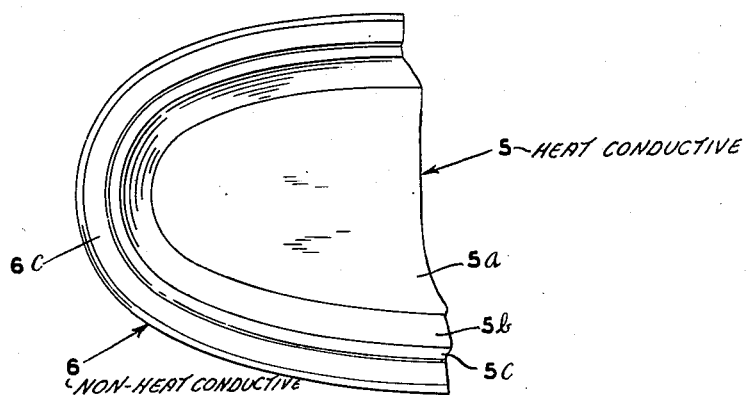
Fig. 2 is a fragmentary top plan view of a slightly different embodiment of my invention adapted as a hot protective platter for service of sizzling steaks and other foods at high temperature.

My service unit for hot food includes an inner relatively heavy metallic plate or platter 5 of symmetrical shape such as circular, oval or polygonal, preferably integrally formed from a heavy sheet of metal such as aluminum, stainless steel and the like and having a substantially flat bottom 5a which merges into a shallow or low peripheral wall 5b having at the upper portion thereof the outturned and substantially horizontal supporting flange 5c. Supporting flange 5c is preferably relatively thin as contrasted with the peripheral and bottom walls 5b and 5a. The underside of the supporting flange 5c may have a narrow supporting bead 5d integrally formed therewith continuously or fragmentarily broken in form to minimize heat-transmissive contact between the inner metallic plate 5 and a compact protective plate or platter 6 in which the inner plate is nested and supported.

I provide an insulating and protective outer plate 6 constructed from solid, relatively non-frangible insulating material shaped generally in conformance to the inner metal plate 5 and having a relatively heavy bottom 6a, a shallow or low peripheral wall 6b and a relatively heavy and wide outturned upper flange 6c which facilitates gripping and handling the entire unit in service.

The inner contour of the plate or platter 6 is constructed throughout its bottom and inner peripheral or side walls of somewhat greater dimensions than the corresponding dimensions of the inner conductive plate 5. The upper and inner edge of the outer plate 6 is rabbeted or otherwise recessed to form a plate-supporting ledge 6d extending preferably circumferentially of the inner periphery of the plate 6 and at a level to engage the lowest circumferential portion such as the bead 5d of the upturned supporting flange 5c of the inner plate 5. The recessing or rabbeting of the upper inward portion of the outer plate 6 also forms a throat or accommodating upstanding shoulder 6e which extends circumferentially at the top of plate 6 and is of similar configuration but slightly larger in dimensions than the peripheral edge of the inner plate 5.

Figure 3:
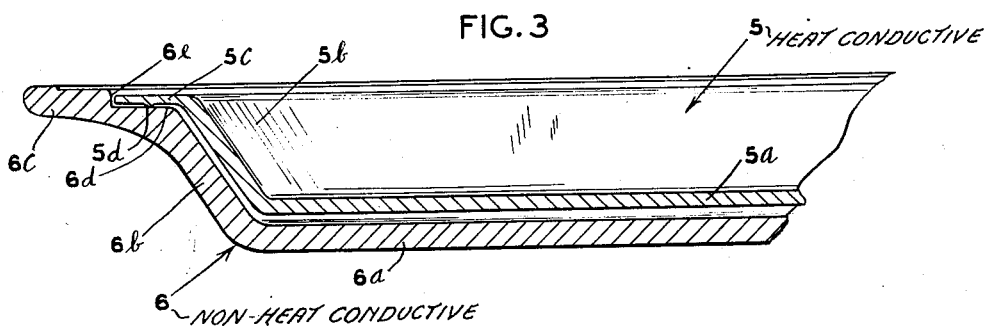
Fig. 3 is a fragmentary cross section on a larger scale, taken along any radical line of Figs. 1 or 2.

From Fig. 3 it will be seen that with my structure as described, a shallow or very thin dead air space is provided between the bottom peripheral wall and the inner portion of the flange 5c of the inner platter 5 and the interior of the insulating platter 6. It will further be seen that contact between the inner platter and the outer insulating platter from which it is supported, is reduced to a minimum, consisting only in the very narrow supporting zone afforded by the bead 5d or by the particular portion of the lower side of flange 5c of the metal platter which rests upon the ledge 6d. Thus, heat transfer conductively from the hot platter 5 to the insulating platter 6, is minimized.

In the research work which preceded my discovery, I unexpectedly found that the efficiency of the insulation value of the said dead air space and the small amount of transmissive conduction of heat from inner to outer platters enables me to manufacture the outer insulating platter 6 from thermo-setting plastics of the type utilizing mineral fillers with phenolic plastic ingredients.

Thermo-setting plastics using phenol formaldehyde with mineral fillers such as mica or asbestos are satisfactory as of course are other mineral filled phenolic thermo-setting plastics. The surprising thing is that such thermo-setting plastic materials which are substantially indestructible, relatively dense and highly ornate, may be successfully used with aluminum or stainless steel inner platters 5 where the temperature of the inner platter exceeds 400° F.

In use, food articles such as meats, biscuits may be, if desired, cooked in the inner platter 5 and after cooking, the inner platter transferred to its supported position as shown in Fig. 3 within the insulating platter 6 at a temperature of 400 or 450° F. The food so supported may then be served by the waiter or waitress or housewife, outer platter 6 heat-insulating the inner platter and food material and protecting the server as well as the user.

In eating food from the service unit, the user is protected from burning his or her hands by the out-turned insulating flange 6c, the top of which is disposed above the level of the top of the metallic flange 5c of the hot inner plate or platter.

It will of course, be understood that various changes may be made in the form, details, arrangement and proportions of the parts without departing from the scope of my invention.

What I claim is:

1. A service unit for hot foods comprising a shallow relatively non-heat conductive outer platter including imperforate bottom and side walls, said side walls terminating in an upper combined supporting and insulating peripheral flange extending substantially horizontally outwardly therefrom, said flange being recessed to provide a continuous shoulder thereon in spaced relation to the outer peripheral edge and said shoulder defining a continuous ledge, the ledge being below the upper surface of the flange and extending between the shoulder and the inner surface of the wall of the outer platter, a shallow heat conductive inner platter having the general configuration of the first mentioned platter and including imperforate bottom and side walls, said side walls terminating in an outturned flange having considerably less horizontal extent than the horizontal extent of the first mentioned flange, the dimensions of the heat conductive platter and its flange bearing such relation to the dimensions of the non-heat conductive platter and the shoulder and ledge thereon that the heat conductive platter nests within the non-heat conductive platter with the ledge on the flange of the non-heat conductive platter receiving and supporting the flange of the heat conductive platter with clearance between the peripheral edge of the flange of the heat conductive platter and the shoulder of the non-heat conductive platter and with the bottom and side walls of the heat conductive platter being supported in spaced relation to the corresponding walls of the non-heat conductive platter, thereby defining an insulating air space between the platters, the increased width of the supporting flange constituting a continuous handle extending completely around the platters permitting ready handling of the nested platters regardless of the heat content of the heat conductive platter and the flange on the heat conductive platter having a rib depending therefrom defining the sole contact between said flange and the ledge on the supporting flange, thereby minimizing direct heat transmission between the platters.

2. A service unit for hot foods comprising nested inner and outer platters having imperforate bottom and side walls, the inner platter being heat conductive and the outer platter non-heat conductive, the inner platter being shallower and smaller than the outer platter and having its bottom and side walls spaced from the adjacent walls of the outer platter, continuous flanges extending from the upper ends of the walls of each platter, the flange on the outer platter being wider than the flange on the inner platter and having a continuous shoulder thereon inwardly of the peripheral edge thereof defining a continuous ledge between the shoulder and the inner surface of the wall of the outer platter, the entire surface of said ledge being in the same plane and at least a portion of the under surface of the flange on the inner platter continuously contacting and being supported by the upper surface of the ledge to provide a seal for the space between the platters, the area of the flange of the outer platter projecting beyond the supported flange of the inner platter constituting a continuous handle extending completely around the platters, the upper surface of the ledge being disposed below the upper surface of the flange on the outer platter a distance greater than the thickness of the flange on the inner platter and the relative dimensions of the platters being such that the peripheral edge of the flange on the inner platter is in clearance relation relative to the shoulder on the flange of the outer platter.

ARTHUR J. MURRAY.

REFERENCES CITED

The following references are of record in the file of this patent:

UNITED STATES PATENTS

| Number | Name | Date |
|---|---|---|
| 102,311 | Penfield | Apr. 26, 1870 |
| 366,968 | McClave | July 19, 1887 |
| 924,849 | Smith | June 15, 1909 |
| 1,123,793 | Pick | Jan. 5, 1915 |
| 1,696,098 | McGranighan | Dec. 18, 1928 |
| 1,745,606 | Densmore et al. | Feb. 4, 1930 |
| 2,051,446 | Ice | Aug. 18, 1936 |
| 2,119,342 | Morris | May 31, 1938 |
| 2,169,426 | Morton | Aug. 15, 1939 |
| 2,211,030 | Rutenber | Aug. 13, 1940 |
| 2,213,837 | Gill | Sept. 3, 1940 |
| 2,332,173 | Shaffer | Oct. 19, 1943 |

FOREIGN PATENTS

| Number | Country | Date |
|---|---|---|
| 632,619 | Germany | July 10, 1936 |